United States Patent
Imai

(10) Patent No.: US 8,016,296 B2
(45) Date of Patent: Sep. 13, 2011

(54) METAL LAMINATE GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 765 days.

(21) Appl. No.: 12/068,480

(22) Filed: Feb. 7, 2008

(65) Prior Publication Data

US 2008/0197580 A1 Aug. 21, 2008

(30) Foreign Application Priority Data

Feb. 15, 2007 (JP) ................................. 2007-034825

(51) Int. Cl.
*F02F 11/00* (2006.01)
(52) U.S. Cl. ........................................ 277/593; 277/595
(58) Field of Classification Search .......... 277/592–595, 277/598, 600, 601; 123/195, 193.1
See application file for complete search history.

(56) References Cited

U.S. PATENT DOCUMENTS

| | | | | |
|---|---|---|---|---|
| 4,739,999 A | * | 4/1988 | Ishii et al. | 277/595 |
| 4,861,046 A | * | 8/1989 | Udagawa | 277/595 |
| 5,435,575 A | * | 7/1995 | Udagawa | 277/592 |
| 5,511,796 A | * | 4/1996 | Udagawa | 277/593 |
| 7,739,995 B2 | * | 6/2010 | Yasuda | 123/195 R |
| 7,753,378 B2 | * | 7/2010 | Kinoshita et al. | 277/594 |
| 2005/0179210 A1 | * | 8/2005 | Sueda | 277/592 |
| 2006/0163819 A1 | * | 7/2006 | Kasuya | 277/593 |
| 2006/0163820 A1 | * | 7/2006 | Udagawa et al. | 277/593 |

FOREIGN PATENT DOCUMENTS

| | | |
|---|---|---|
| DE | 698 12 454 T2 | 9/2003 |
| DE | 10 2006 003 355 A1 | 10/2006 |
| EP | 0 866 246 A1 | 9/1998 |
| EP | 1 308 653 A2 | 5/2003 |
| EP | 1 544 518 A1 | 6/2005 |
| EP | 1 564 453 A1 | 8/2005 |
| JP | 2006-207688 | 8/2006 |

* cited by examiner

*Primary Examiner* — Shane Bomar
*Assistant Examiner* — Kipp Wallace
(74) *Attorney, Agent, or Firm* — Manabu Kanesaka

(57) ABSTRACT

A metal laminate gasket includes a first metal plate having a folded portion at a peripheral of a combustion chamber hole, a second metal plate provided in the folded portion, a third metal plate provided in the folded portion and having an extension portion extending outwardly from the folded portion, a fourth metal plate provided on a folded side of the first metal plate and partially overlapping a part of the extension portion of the third metal plate, and a fifth metal plate provided on the folded side of the first metal plate so that the fifth metal plate does not overlap the third metal plate. A bead is provided on at least one of the second and third metal plates and situated inside the folded portion. A total thickness of the metal laminate gasket declines in a stepwise fashion from the folded portion.

10 Claims, 2 Drawing Sheets

METAL LAMINATE GASKET

BACKGROUND OF THE INVENTION AND RELATED ART STATEMENT

The present invention relates to a metal laminate gasket installed between a cylinder head and a cylinder block of an internal combustion engine to seal therebetween.

Recently, because of improved technologies of an engine, the maximum explosion pressure tends to become high. Especially, in a diesel engine, the tendency of the high maximum explosion pressure is remarkable. On the other hand, because of a tendency of making the engines lighter, the mechanical strength tends to decline. As a result, a lift or upward movement of the cylinder head during the cylinder explosion increases, so that a following capability relative to the lift of the cylinder head gasket is required.

However, in a well-known metal laminate cylinder head gasket, especially, the metal laminate cylinder head gasket, which forms a first seal portion with a bead around a combustion chamber hole, has a smaller amount of compression of the original bead compared to the lift mentioned above. Accordingly, in order to assure the following capability relative to the increased lift, in addition to the existing first seal portion with a large total thickness of laminated metal plates around the combustion chamber hole, the well-known metal laminate cylinder head gasket is provided with a second seal portion with the following capability relative to the lift, wherein the total thickness of the laminated metal plates is smaller than that of the first seal portion, but the cylinder head is larger than that of the first seal portion, so that following capability is assured even when the cylinder head is widely lifted (refer to a Japanese Patent Publication (TOKKAI) No. 2006-207688).

Basically, it is preferred that the following capability relative to the lift of the cylinder head is assured at the first seal portion. In such a case, if there is a large difference in level between the first seal portion which has a large total thickness of the laminated metal plates and the second seal portion which has a total thickness of the laminated metal plates smaller than that of the first seal portion, a compression mark may remain in the cylinder head and/or the cylinder block due to the difference in the total thickness. As a result, the sealing quality of each seal portion may be significantly deteriorated.

This invention is made in order to solve the above-mentioned problems, and an object of the present invention is to provide a metal laminate gasket wherein the first seal portion around the combustion chamber hole can assure the following capability relative to the lift of the cylinder head in the cylinder explosion, and the difference in the total thickness of the seal portions around the combustion chamber hole is set in a stepwise fashion from the first seal portion through a third seal portion, so that an excellent sealing quality of the seal portions can be assured without any compression mark in the cylinder head and/or the cylinder block due to the difference in thickness.

Further objects and advantages of the invention will be apparent from the following description of the invention.

SUMMARY OF THE INVENTION

In order to achieve the objects described above, a metal laminate gasket according to the present invention is formed of laminating multiple metal plates, and provided with a combustion chamber hole corresponding to the combustion chamber of a cylinder block and a through-hole corresponding to a fluid hole whose surrounding area is to be sealed. The metal laminate gasket comprises a first metal plate forming an outer plate of the gasket and folded back at the peripheral border of the combustion chamber hole. The first metal plate sandwiches a second metal plate which is located inside the folded portion thereof, and a third metal plate including an extension portion projecting outwardly from the folded portion. A fourth metal plate is laminated on the folded side of the first metal plate, and a part of the fourth metal plate overlaps with the extension portion of the third metal plate. Also, a fifth metal plate is laminated in a range where the fifth metal plate does not overlap the third metal plate. A bead is provided on at least one of the second and third metal plates within a range where the second and third metal plates are covered by the folded portion of the first metal plate.

The metal laminate gasket comprises a first seal portion constituted of the folded portion of the first metal plate sandwiching the second and third metal plates; a second seal portion constituted of the laminated portion of the first and fourth metal plates and the extension portion of the third metal plate; and a third seal portion constituted of the laminated portion of the first, fourth and fifth metal plates. The total thickness of the first, fourth and fifth metal plates of the third seal portion is designed to be smaller than the total thickness of the first, third and fourth metal plates of the second seal portion. Also, the total thickness of the second seal portion is designed to be smaller than the total thickness of the double thickness of the first metal plate of the first seal portion and the second and third metal plates. As a result, a group of the seal portions is structured, and a total thickness thereof declines in a stepwise fashion from the first seal portion through the third seal portion.

According to a preferred embodiment of the metal laminate gasket in the invention, the second seal portion is provided with a bead in the third or fourth metal plate forming the second seal portion.

Also, in another preferred embodiment of the metal laminate gasket of the invention, the extension portion of the third metal plate is sandwiched between the first metal plate and the fourth metal plate, and the fifth metal plate is also sandwiched between the first metal plate and the fourth metal plate in a range where the first and fourth metal plates do not overlap the third metal plate. Alternatively, the fourth metal plate is sandwiched between the first and third metal plates in a range overlapping the extension portion of the third metal plate, and sandwiched between the first and fifth metal plates in a range not overlapping the third metal plate.

In another preferred embodiment of the metal laminate gasket of the invention, the thickness of the fourth metal plate is designed to be smaller than the total thickness of the thickness of the first metal plate and the thickness of the second metal plate. Also, the thickness of the fifth metal plate is designed to be smaller than that of the third metal plate.

In the metal laminate gasket with the above-mentioned structure, the first metal plate constituting an outer plate of the gasket is folded back at the peripheral border of the combustion chamber hole, and sandwiches the second metal plate inside the folded portion thereof, and the third metal plate including the extension portion extending outwardly from the folded portion. Also, the bead is provided on at least one of the second and third metal plates within the range sandwiched by the folded portion of the first metal plate. As a result, an excellent following capability of the cylinder head relative to the lift upon the combustion in a cylinder can be assured in the first seal portion around the combustion chamber hole.

In addition, by only adding the second metal plate to the gasket of the Japanese Patent Publication (TOKKAI) No. 2006-207688, and adjusting the relative thicknesses of the first to fifth metal plates, the seal portions around the combustion chamber hole can be formed of the group of the seal portions wherein the total thickness declines in a stepwise fashion from the first seal portion through the third seal portion. As a result, the excellent sealing quality of the seal portions can be assured without any compression mark in the cylinder head and/or the cylinder block due to a difference in thickness thereof.

According to the metal laminate gasket of the invention described above, the following capability of the cylinder head relative to the lift upon the combustion or explosion in the cylinder can be assured in the first seal portion around the combustion chamber hole. Also, by setting the difference in thickness of the seal portions around the combustion chamber hole in a stepwise fashion from the first seal portion through the third seal portion, the excellent sealing quality of the seal portions can be assured without any compression mark in the cylinder head and/or the cylinder block due to the difference in thickness thereof.

DETAILED DESCRIPTION OF PREFERRED EMBODIMENTS

Figure 1:
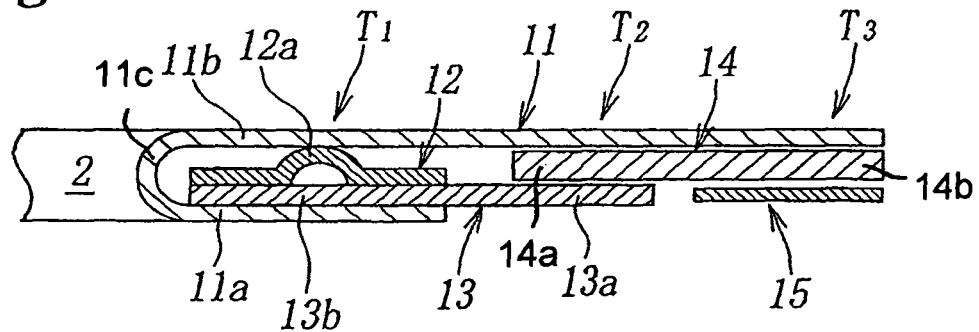
FIG. 1 is a sectional view of an essential part of a metal laminate gasket according to the first embodiment of the present invention.

FIG. 1 shows a sectional view around a combustion chamber hole 2 in the first embodiment of a metal laminate gasket according to the invention.

The metal laminate gasket 1 is formed by laminating first to fifth metal plates 11, 12, 13, 14, 15 as a whole, and includes a combustion chamber hole 2 corresponding to a combustion chamber of a cylinder block and a through-hole (not shown) corresponding to a fluid hole whose surrounding area is to be sealed. At the peripheral border of the combustion chamber hole 2, the first metal plate 11 forming an outer plate of the gasket is folded back. Inside a folded portion 11a thereof, a ring-shaped second metal plate 12 structured as a boring, and a sandwiched portion 13b of the third metal plate 13 including an extension portion 13a projecting outwardly from the folded portion 11a, are sandwiched. Moreover, a metal plate portion 14a of the fourth metal plate 14, which overlaps the extension portion 13a of the third metal plate 13, is sandwiched between the first metal plate 11 and the extension portion 13a of the third metal plate 13. Also, a metal plate portion 14b of the fourth metal plate 14, which does not overlap the third metal plate 13, is sandwiched between the first metal plate 11 and the fifth metal plate 15 forming the other outer plate.

The first metal plate 11 includes a base portion or metal plate portion 11b, a curved portion 11c extending from the base portion 11b, and the folded portion 11a extending from the curved portion. A folded place is formed by the folded portion 11a, the curved portion 11c and the metal plate portion 11b facing the folded portion 11a. By the folded portion 11a and the metal plate portion 11b of the folded place, the whole second metal plate 12 disposed on a metal plate portion 11b side, and the sandwiched portion 13b of the third metal plate 13 disposed on a side of the folded portion 11a, are sandwiched in a laminated state.

Also, the second metal plate 12 forms a bead 12a, and the bead 12a projects toward a pressure contact side of the metal plate portion 11b of the first metal plate 11 within a range wherein the metal plate 12 is sandwiched inside the folded portion 11a of the first metal plate 11. The bead 12a comprises a circular full bead surrounding the combustion chamber hole 2 in a concentric fashion with the combustion chamber hole 2.

With respect to the relationship of the thicknesses of the metal plates 11 to 15 forming the metal laminate gasket 1, a thickness $t_4$ of the fourth metal plate is designed to be smaller than a total thickness of a thickness $t_1$ of the first metal plate and a thickness $t_2$ of the second metal plate ($t_4 < t_1 + t_2$). Also, a thickness $t_5$ of the fifth metal plate is designed to be smaller than the thickness $t_3$ of the third metal plate ($t_5 < t_3$).

The thicknesses of the metal plates 11 to 15 can be set, for example, as follows.

$t_1 = 0.20t$ $t_2 = 0.20t$ $t_3 = 0.25t$ $t_4 = 0.35t$ $t_5 = 0.15t$

With the above-mentioned structure, the metal laminate gasket 1 forms a first seal portion $T_1$ which comprises the folded place of the first metal plate 11 sandwiching the second and third metal plates 12, 13; a second seal portion $T_2$ which comprises a portion laminated by the first and fourth metal plates 11, 14 and the extension portion 13a of the third metal plate 13; and a third seal portion $T_3$ which comprises a portion laminated by the first, fourth and fifth metal plates 11, 14, 15. The total thickness of the first, fourth and fifth metal plates 11, 14, 15 ($t_1 + t_4 + t_5$) of the third seal portion $T_3$ is designed to be smaller than the total thickness of the first, third and fourth metal plates 11, 13, 14 ($t_1 + t_3 + t_4$) of the second seal portion $T_2$. The total thickness of the second seal portion T2 is designed to be smaller than the total thickness of a double thickness of the first metal plate and the second and third metal plates ($2t_1 + t_2 + t_3$) of the first seal portion $T_1$. As a result, a group of the seal portions is structured, and the total thicknesses thereof decline in a stepwise fashion from the first seal portion $T_1$ through the third seal portion $T_3$.

For example, when the thicknesses $t_1$ to $t_5$ of the metal plates 11 to 15 are set as the thicknesses shown in the above-mentioned examples, the difference of the total thicknesses of differences $T_1-T_2$ and $T_2-T_3$ between the seal portions is set as follows.

$$T_1-T_2=0.05t$$

$$T_2-T_3=0.10t$$

In the metal laminate gasket 1 with the above-mentioned structure, the first metal plate 11 forming the outer plate of the gasket 1 is folded back at the peripheral border of the combustion chamber hole 2, and inside the folded portion 11a, the second metal plate 12 and the third metal plate 13 including the extension portion 13a projecting outwardly from the folded portion 11a are sandwiched. Since the second metal plate 12 is provided with the bead 12a within a range where the bead 12a is sandwiched inside the folded portion 11a of the first metal plate 11, the excellent following capability of the cylinder head relative to a lift or upward movement by an explosion or combustion in the cylinder can be assured in the first seal portion $T_1$ around the combustion chamber hole.

In addition, since the seal portion around the combustion chamber hole is formed of the group of the seal portions wherein the total thickness declines in a stepwise fashion from the first seal portion $T_1$ through the third seal portion $T_3$, the excellent sealing quality of the seal portions can be assured without any compression mark in the cylinder head and/or the cylinder block due to the difference in thickness thereof.

Figure 2:
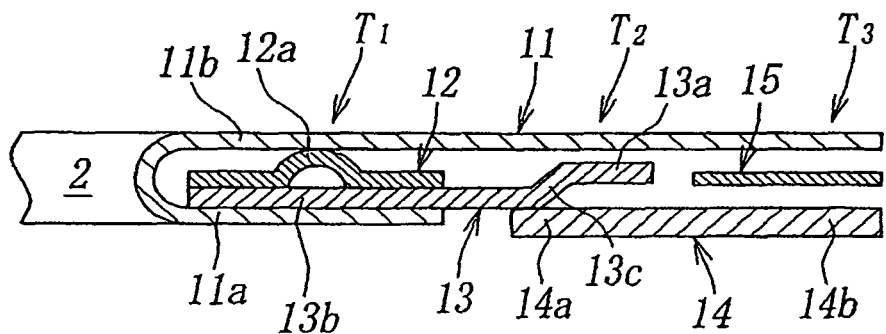
FIG. 2 is a sectional view of an essential part of the metal laminate gasket according to the second embodiment of the present invention.

FIG. 2 shows a sectional view around the combustion chamber hole 2 of a second embodiment of the metal laminate gasket according to the invention.

In the metal laminate gasket 1, the basic structure of the first to fifth metal plates 11 to 15 forming the gasket 1 is approximately the same as that of the first embodiment. However, the placement of the metal plates 11 to 15 partially differs.

More specifically, the metal laminate gasket 1 is laminated such that the fourth metal plate 14 is located in the other part of the outer plate on the surface of the folded portion side of the first metal plate 11. The extension portion 13a of the third metal plate 13 is sandwiched between the first metal plate 11 and the metal plate portion 14a of the fourth metal plate 14. The fifth metal plate 15 is sandwiched between the metal plate portion 14b and the first metal plate 11 in a range not overlapping the third metal plate 13 of the fourth metal plate 14.

Also, the extension portion 13a of the third metal plate 13 forms a bead 13c comprising a half bead surrounding the combustion chamber hole 2 in a concentric fashion with the combustion chamber hole 2, and the bead 13c is inclined toward the metal plate portion 11b side of the first metal plate 11. As mentioned above, by providing the bead 13c comprising the half bead in the extension portion 13a of the third metal plate 13 situated in the second seal portion $T_2$ as well as the first seal portion $T_1$ provided with the bead 12a comprising the full bead, the following capability of the cylinder head relative to the lift can be assured. Consequently, reliabilities and the sealing quality of the seal portions around the combustion chamber hole can be assured.

Incidentally, other structures and operations of the second embodiment are substantively the same as those of the first embodiment, so that the same symbols are assigned to the same or corresponding parts, and their explanations are omitted.

Here, in the second embodiment, the bead 13c, i.e. the half bead surrounding the combustion chamber hole 2 in a concentric fashion with the combustion chamber hole 2, is formed in the extension portion 13a of the third metal plate 13 comprising the gasket 1. The bead 13c is also inclined toward the metal plate portion 11b side of the first metal plate 11. However, the embodiment is not limited to the case wherein the bead is set as mentioned above. The most appropriate bead in the respective seal portions $T_1$ to $T_3$ is set in relationship with the thicknesses $t_1$ to $t_5$ and placement of the metal plates 11 to 15 forming the gasket 1, and each difference in level between the first to third seal portions $T_1$ to $T_3$. As a result, the compatibility of the cylinder head relative to the lift can be improved in the seal portions $T_1$ to $T_3$.

Figure 3:
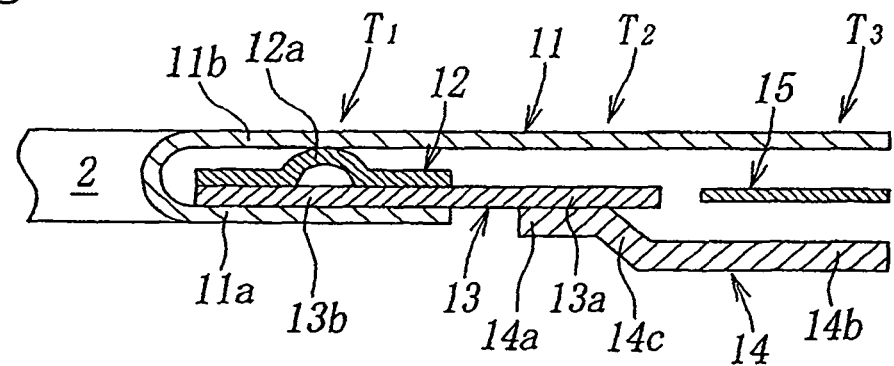
FIG. 3 is a sectional view of an essential part of the metal laminate gasket according to the third embodiment of the present invention.

More specifically, in the third embodiment shown in FIG. 3, instead of the bead 13c forming the half bead formed in the extension portion 13a of the third metal plate 13 of the second embodiment, a bead 14c is formed in the metal plate portion 14a of the fourth metal plate 14, which overlaps the extension portion 13a of the third metal plate 13. The bead 14c forms the half bead surrounding the combustion chamber hole 2 in a concentric fashion with the combustion chamber hole 2, and inclines in a direction away from the third metal plate 13.

Figure 4:
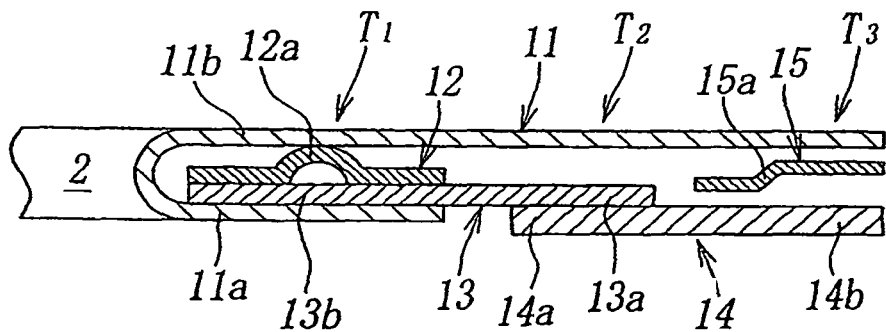
FIG. 4 is a sectional view of an essential part of the metal laminate gasket according to the fourth embodiment of the present invention.

Incidentally, in the second and third embodiments, the beads 13c, 14c are formed in the extension portion 13a of the third metal plate 13 and the metal plate portion 14a of the fourth metal plate 14, which respectively form the second seal portion $T_2$. However, as in the case of the metal laminate gasket 1 of the fourth embodiment shown in FIG. 4, a bead 15a forming the half bead can be also formed in the fifth metal plate 15 in the third seal portion $T_3$.

Figure 5:
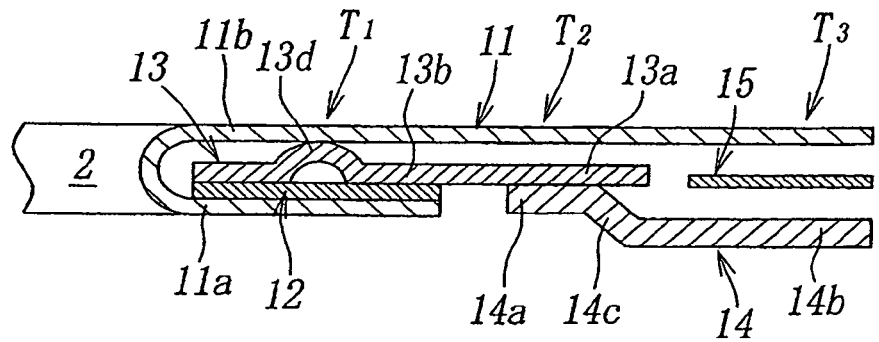
FIG. 5 is a sectional view of an essential part of the metal laminate gasket according to the fifth embodiment of the present invention.

In the first to fourth embodiments, the bead 12a, i.e. the full bead, is formed in the second metal plate 12 sandwiched in the folded place of the first metal plate 11. However, as in the case of a fifth embodiment shown in FIG. 5, a bead 13d formed by the full bead can be formed in the sandwiched portion 13b of the third metal plate 13 and projects to the pressure contact side of the metal plate portion 11b of the first metal plate 11 within the range wherein the bead 13d is sandwiched in the folded place of the first metal plate 11. In this case, the second metal plate 12 and the third metal plate 13 are mutually replaced.

Figure 6:
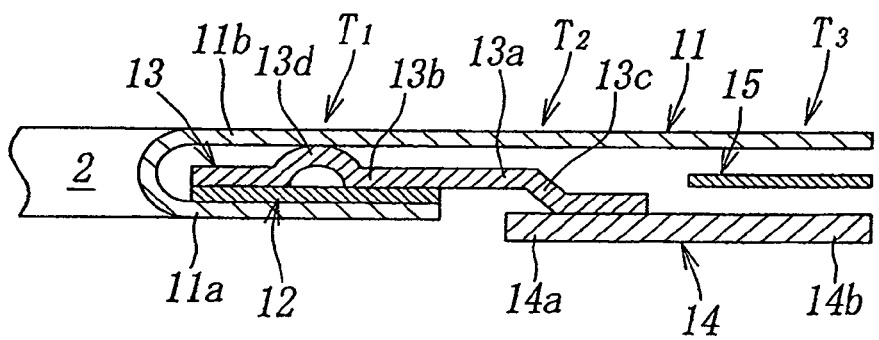
FIG. 6 is a sectional view of an essential part of the metal laminate gasket according to the sixth embodiment of the present invention.

Also, the bead 14c formed by the half bead can be formed in the metal plate portion 14a of the fourth metal plate 14 forming the second seal portion $T_2$, or as in the case of a sixth embodiment shown in FIG. 6, the bead 13c formed by the half bead can be formed in the extension portion 13a of the third metal plate 13 forming the second seal portion $T_2$.

Figure 7:
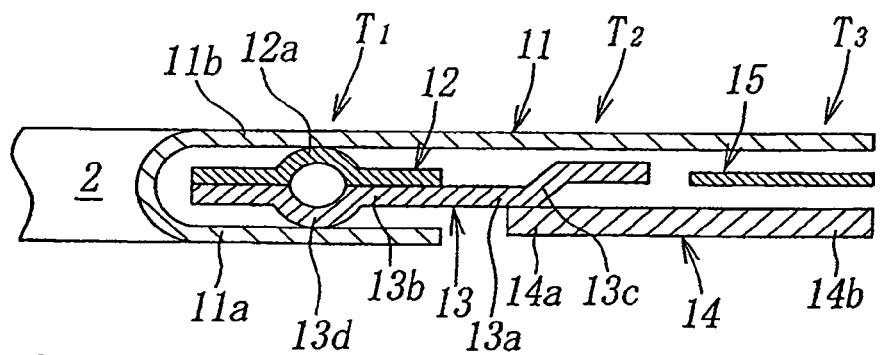
FIG. 7 is a sectional view of an essential part of the metal laminate gasket according to the seventh embodiment of the present invention.

Moreover, in the first to sixth embodiments, the bead 12a or 13d formed as the full bead is formed in either the second metal plate 12 or the sandwiched portion 13b of the third metal plate, which are sandwiched in the folded place of the first metal plate 11. However, as in the case of a seventh embodiment shown in FIG. 7, the bead 12a formed by the full bead can be formed in the second metal plate 12 and projects to the pressed contacting side of the metal plate portion 11b of the metal plate 11. Also, the bead 13d formed by the full bead can be formed in a position corresponding to the bead 12a of the second metal plate 12 of the sandwiched portion 13b of the third metal plate 13. The bead 13d can project in an opposite direction of the bead 12a of the metal plate 12, and toward the pressure contact side of the folded portion 11a of the first metal plate 11. In this case, the bead 13c formed by the half bead can be formed in the extension portion 13a of the third metal plate 13 forming the second seal portion $T_2$.

Figure 8:
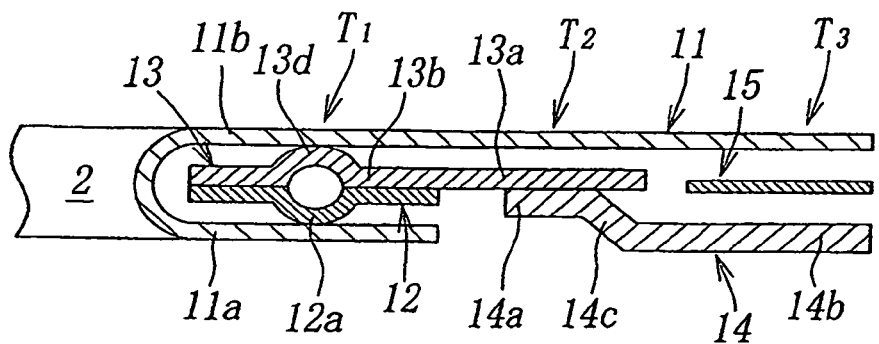
FIG. 8 is a sectional view of an essential part of the metal laminate gasket according to the eighth embodiment of the present invention.

Incidentally, even in the above-mentioned case, as in the case of an eighth embodiment shown in FIG. 8, the second metal plate 12 and the third metal plate 13, which are sandwiched in the folded place of the first metal plate 11, can be mutually replaced. At this time, the bead 14c forming by the half bead can be formed in the metal plate portion 14a of the fourth metal plate 14 forming the second seal portion $T_2$.

Here, the other structures and operations in the third to eighth embodiments are substantively the same as those of the first and second embodiments, so that the same symbols are assigned to the same or corresponding parts, and their explanations are omitted.

The disclosure of Japanese Patent Application No. 2007-034825, filed on Feb. 15, 2007, is incorporated in the application.

While the invention has been explained with reference to the specific embodiments of the invention, the explanation is illustrative and the invention is limited only by the appended claims.

What is claimed is:

1. A metal laminate gasket for an internal combustion engine having a cylinder bore and a fluid hole, comprising:
    a first metal plate including a base portion, a curved portion extending from the base portion to define the cylinder bore, and a folded portion extending from the curved portion and located under the base portion;
    a second metal plate provided in between the base portion and the folded portion;
    a third metal plate provided in between the base portion and the folded portion and including an extension portion extending outwardly from the folded portion;
    a fourth metal plate overlapping the base portion outside the folded portion and partially overlapping a part of the extension portion of the third metal plate, the fourth metal plate having a thickness greater than that of the first metal plate;
    a fifth metal plate overlapping the base portion without overlapping the third metal plate;
    a bead provided on at least one of the second and third metal plates and situated inside the folded portion;
    a first seal portion constituted of the base portion and the folded portion sandwiching the second and third metal plates;
    a second seal portion constituted of the base portion, the extension portion of the third metal plate and the fourth metal plate; and
    a third seal portion constituted of the base portion and the fourth and fifth metal plates,
    wherein a total thickness of the metal plates forming the second seal portion is greater than that forming the third seal portion and is smaller than that forming the first seal portion, and the total thickness declines in a stepwise fashion from the first seal portion to the third seal portion.

2. A metal laminate gasket according to claim 1, wherein the fourth metal plate is sandwiched between the base portion and the third metal plate in a range where the fourth metal plate overlaps the extension portion of the third metal plate, and sandwiched between the base portion and the fifth metal plate in a range where the fourth metal plate does not overlap the third metal plate.

3. A metal laminate gasket according to claim 1, wherein the extension portion and the fifth metal plate are sandwiched between the base portion and the fourth metal plate.

4. A metal laminate gasket according to claim 3, wherein said second seal portion includes a half bead provided on the third or fourth metal plate at the second seal portion.

5. A metal laminate gasket according to claim 1, wherein the fourth metal plate has a thickness smaller than a total thickness of the first metal plate and the second metal plate, and the fifth metal plate has a thickness smaller than that of the third metal plate.

6. A metal laminate gasket according to claim 3, wherein said fifth metal plate includes a half bead at the third seal portion.

7. A metal laminate gasket according to claim 4, wherein the second and third metal plates have the beads projecting in opposite directions from each other at the first seal portion.

8. A metal laminate gasket according to claim 1, wherein the second metal plate has an annular shape having a width substantially same as that of the folded portion.

9. A metal laminate gasket according to claim 8, wherein said third metal plate has an annular shape greater in width than that of the second metal plate and extends outwardly from the second metal plate.

10. A metal laminate gasket for an internal combustion engine having a cylinder bore and a fluid hole, comprising:
    a first metal plate including a base portion, a curved portion extending from the base portion to define the cylinder bore, and a folded portion extending from the curved portion and located under the base portion;
    a second metal plate provided in between the base portion and the folded portion and disposed above the folded portion without extending outside of the folded portion, said second metal plate having a bead projecting toward the base portion;
    a third metal plate provided in between the base portion and the folded portion and including an extension portion extending outwardly from the folded portion, said third metal plate having a thickness greater than those of the first and second metal plates;
    a fourth metal plate overlapping the base portion outside the folded portion and partially overlapping a part of the extension portion of the third metal plate, the fourth metal plate having a thickness greater than that of the first metal plate;
    a fifth metal plate overlapping the base portion without overlapping the third metal plate and having a thickness less than those of the first and second metal plates;
    a first seal portion constituted of the base portion and the folded portion sandwiching the second and third metal plates;
    a second seal portion constituted of the base portion, the extension portion of the third metal plate and the fourth metal plate; and
    a third seal portion constituted of the base portion and the fourth and fifth metal plates,
    wherein a total thickness of the metal plates forming the second seal portion is greater than that forming the third seal portion and is smaller than that forming the first seal portion, and the total thickness declines in a stepwise fashion from the first seal portion to the third seal portion.

* * * * *